(12) United States Patent
Palaniappan et al.

(10) Patent No.: US 8,904,221 B2
(45) Date of Patent: Dec. 2, 2014

(54) ARBITRATION CIRCUITRY FOR ASYNCHRONOUS MEMORY ACCESSES

(75) Inventors: Sathappan Palaniappan, Tamilnadu (IN); Srinivasa Rao Kothamasu, Karnataka (IN); Deepak Ashok Naik, Karnataka (IN)

(73) Assignee: LSI Corporation, Milpitas, CA (US)

( * ) Notice: Subject to any disclaimer, the term of this patent is extended or adjusted under 35 U.S.C. 154(b) by 552 days.

(21) Appl. No.: 13/334,885

(22) Filed: Dec. 22, 2011

(65) Prior Publication Data

US 2013/0166938 A1 Jun. 27, 2013

(51) Int. Cl.
*G06F 1/12* (2006.01)
*G06F 13/42* (2006.01)
*H04L 7/00* (2006.01)

(52) U.S. Cl.
USPC .......................................... 713/400; 713/401

(58) Field of Classification Search
None
See application file for complete search history.

(56) References Cited

U.S. PATENT DOCUMENTS

| | | | | |
|---|---|---|---|---|
| 7,248,661 | B1 * | 7/2007 | Almog et al. | 375/358 |
| 8,260,982 | B2 * | 9/2012 | Paulson et al. | 710/33 |
| 8,428,207 | B1 * | 4/2013 | Dally et al. | 375/355 |
| 8,433,875 | B2 * | 4/2013 | Cortadella et al. | 711/167 |
| 2003/0081713 | A1 * | 5/2003 | Pontius et al. | 375/372 |
| 2009/0240969 | A1 * | 9/2009 | Chiu et al. | 713/401 |
| 2010/0146468 | A1 * | 6/2010 | Czeck et al. | 716/6 |
| 2012/0151243 | A1 * | 6/2012 | Ono et al. | 713/400 |
| 2013/0013950 | A1 * | 1/2013 | Maddigan et al. | 713/400 |
| 2013/0166938 | A1 * | 6/2013 | Palaniappan et al. | 713/400 |
| 2013/0205160 | A1 * | 8/2013 | Turner et al. | 713/400 |

OTHER PUBLICATIONS

Cummings, C. E., Simulation and Synthesis Techniques for Asynchronous FIFO Design, SNUG, 2002, pp. 1-23, Sunburst Design.*
Cummings, C.E., Clock Domain Crossing (CDC) Design & Verification Techniques Using System Verilog, Synopsis User Group, 2008, pp. 1-56, Sunburst Design, Boston, MA, USA.

* cited by examiner

*Primary Examiner* — Tanh Nguyen
(74) *Attorney, Agent, or Firm* — Sheridan Ross P.C.

(57) ABSTRACT

A data processing system comprises a processor operating according to a first clock signal and a memory operating according to a second clock signal. The data processing system causes the processor to read data from the memory at least in part in response to a signal from first synchronizing circuitry and a signal from second synchronizing circuitry. The first synchronizing circuitry comprises a first storage element that samples a signal synchronized to the second clock signal in combination with a second storage element that samples an output of the first storage element. The first and second storage elements are triggered by inverse transitions in the first clock signal. The second synchronizing circuitry comprises third and fourth storage elements configured in a similar manner, except that they sample a signal synchronized to the first clock signal and are triggered by inverse transitions in the second clock signal.

20 Claims, 3 Drawing Sheets

ARBITRATION CIRCUITRY FOR ASYNCHRONOUS MEMORY ACCESSES

BACKGROUND

In many modern integrated circuits such as system-on-chips (SOCs), multiple clocks have become the norm. As a result, arbitration circuitry for handling clock domain crossings (CDCs) has become an integral part of many designs. Such arbitration circuitry may, for example, allow two processors operating in asynchronous clock domains to access a common single-ported memory. However, because the arbitration circuitry ultimately affects memory access latencies of both masters, its switching speed tends to be a critical design parameter.

SUMMARY

Embodiments of the invention provide apparatus and methods related to systems wherein a processor operating in one clock domain is operative to access a memory operating in a different clock domain. To accomplish this, embodiments of the invention utilize unique arbitration circuit designs. These arbitration circuit designs mitigate race conditions and signal metastability issues associated with multiple clock domains, while, at the same time, providing superior memory access latency characteristics, among other benefits.

In accordance with an embodiment of the invention, a data processing system comprises a processor operating in a first clock domain with a first clock signal, a memory operating in a second clock domain with a second clock signal, a storage device, first synchronization circuitry, and second synchronization circuitry. The first synchronization circuitry comprises a first storage element and a second storage element. The first storage element samples a signal emanating from the second clock domain, and the second storage element samples an output of the first storage element. In doing so, the first and second storage elements are triggered by inverse transitions in the first clock signal. The second synchronization circuitry, in turn, comprises a third storage element and a fourth storage element, with the third storage element sampling a signal emanating from the first clock domain and the fourth storage element sampling an output of the third storage element. Here, the third and fourth storage elements are triggered by inverse transitions in the second clock signal. Configured in this manner, the data processing system is operative to cause the processor to transfer a memory address to the storage device, to cause the memory address to be transferred from the storage device to the memory at least in part in response to a signal from the second synchronization circuitry, and to cause data associated with the memory address in the memory to be transferred to the processor at least in part in response to a signal from the first synchronization circuitry.

In accordance with another embodiment of the invention, arbitration circuitry adapted for use with a data processing system including a processor operating in a first clock domain with a first clock signal and a memory operating in a second clock domain with a second clock signal comprises a storage device, first synchronization circuitry, and second synchronization circuitry. The first synchronization circuitry comprises a first storage element and a second storage element. The first storage element samples a signal emanating from the second clock domain, and the second storage element samples an output of the first storage element. In doing so, the first and second storage elements are triggered by inverse transitions in the first clock signal. The second synchronization circuitry, in turn, comprises a third storage element and a fourth storage element, with the third storage element sampling a signal emanating from the first clock domain and the fourth storage element sampling an output of the third storage element. Here, the third and fourth storage elements are triggered by inverse transitions in the second clock signal. Configured in this manner, the data processing system is operative to cause the processor to transfer a memory address to the storage device, to cause the memory address to be transferred from the storage device to the memory at least in part in response to a signal from the second synchronization circuitry, and to cause data associated with the memory address in the memory to be transferred to the processor at least in part in response to a signal from the first synchronization circuitry.

In accordance with yet another embodiment of the invention, a method allowing a processor operating in a first clock domain with a first clock signal to read data stored in a memory operating in a second clock domain with a second clock signal comprises causing the processor to transfer a memory address to the storage device, causing the memory address to be transferred from the storage device to the memory at least in part in response to a signal from second synchronization circuitry, and causing data associated with the memory address in the memory to be transferred to the processor at least in part in response to a signal from first synchronization circuitry. The first synchronization circuitry comprises a first storage element and a second storage element, the first storage element sampling a signal emanating from the second clock domain, and the second storage element sampling an output of the first storage element. The first and second storage elements are triggered by inverse transitions in the first clock signal. The second synchronization circuitry, in turn, comprises a third storage element and a fourth storage element, the third storage element sampling a signal emanating from the first clock domain, and the fourth storage element sampling an output of the third storage element. Here, the third and fourth storage elements are triggered by inverse transitions in the second clock signal.

Embodiments of the present invention will become apparent from the following description of embodiments thereof, which are to be read in connection with the accompanying drawings.

BRIEF DESCRIPTION OF THE DRAWINGS

The following drawings are presented by way of example only and without limitation, wherein like reference numerals (when used) indicate corresponding elements throughout the several views, and wherein.

It is to be appreciated that elements in the figures are illustrated for simplicity and clarity. Common but well-understood elements that may be useful or necessary in a commercially feasible embodiment may not be shown in order to facilitate a less hindered view of the illustrated embodiments.

DETAILED DESCRIPTION OF EMBODIMENTS

Embodiments of the invention will be described herein in the context of illustrative data processing systems. It should be understood, however, that embodiments falling within the scope of the appended claims are not limited to these or any other particular circuit arrangements. It will become apparent to those skilled in the art, given the teachings herein, that numerous modifications can be made to the embodiments shown that are within the scope of the claimed invention. That is, no limitations with respect to the specific embodiments described herein are intended or should be inferred.

Figure 1:
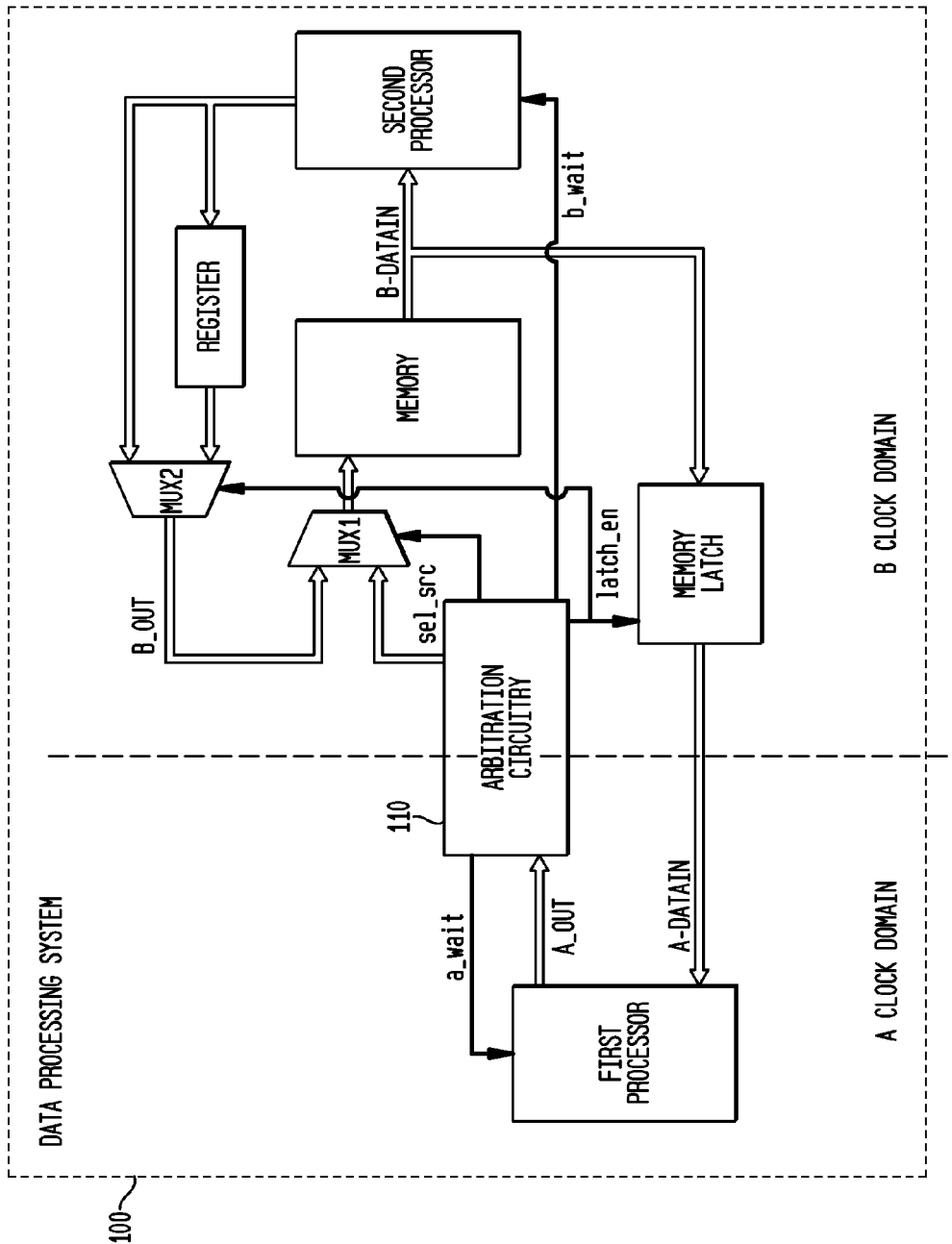
FIG. 1 shows a block diagram of at least a portion of an exemplary data processing system, in accordance with an illustrative embodiment of the invention.

FIG. 1 shows a block diagram of at least a portion of an exemplary data processing system 100 in accordance with an illustrative embodiment of the invention. As indicated in the figure, the exemplary data processing system 100 comprises a first processor, a second processor, a memory, arbitration circuitry 110, a first multiplexer (MUX1), a second multiplexer (MUX2), a register, a memory latch, as well as several data buses and control signal lines. The first processor resides within a first clock domain (A Clock Domain). The second processor, the memory, the first multiplexer, the second multiplexer, the register, and the memory latch reside within a second clock domain (B Clock Domain). The respective clocks of the two clock domains may have different characteristics from each other, for example, frequency, phase, synchronicity, etc.

In the illustrative embodiment shown in FIG. 1, the first processor and the second processor are each capable of performing logic, storage, and/or control functions in association with the memory, as might be the case in an SoC integrated circuit. The memory comprises a single-ported memory such as, but not limited to, a single-ported static random access memory (SPSRAM).

Although running in different clock domains, both the first processor and the second processor are operative to access the memory. Arbitration is thereby required to avoid race conditions. As is known by those skilled in the art, a race condition (or race hazard) is a flaw in an electronic system or process which occurs when an output or result of the system or process is unexpectedly dependent on a sequence or timing of other events. Still referring to FIG. 1, memory access data A_OUT emanating from the first processor is routed to the arbitration circuitry 110. The memory access data A_OUT comprises, for example, one or more of memory address data (A_ADDR), write data (A_DATAOUT), a first processor enablement signal (A_EN), and the like, depending on whether the first processor is performing a read access or a write access. The arbitration circuitry 110, in turn, acts to pass the memory access data A_OUT from the A clock domain to the B clock domain.

Once synchronized to the B clock domain, the memory access data A_OUT is passed to the first multiplexer, where a control signal, sel_src, directs the first multiplexer to pass the memory access data A_OUT to the memory. The control signal sel_src is generated by the arbitration circuitry 110. If the first processor is performing a read access, read data A_DATAIN from the memory is then routed to the first processor through the memory latch. The memory latch is enabled by a control signal, latch_en, also generated in the arbitration circuitry 110.

In the embodiment illustrated in FIG. 1, the second processor, in contrast to the first processor, is already within the same clock domain as the memory and its memory accesses need not cross a clock domain boundary. Memory access data B_OUT emanating from the second processor is split into two paths: one running directly to a first input of the second multiplexer, and the other running to the register and then to a second input of the second multiplexer. The output of the second multiplexer terminates in the first multiplexer and is selected by the control signal latch_en. By temporarily storing the memory access data B_OUT, the register allows the memory access data B_OUT to be maintained at a first input of the first multiplexer during those periods when the first processor is actively performing memory accesses. Ultimately, the control signal sel_src is operative to cause the first multiplexer to transmit the memory access data B_OUT to the memory. If the second processor is performing a read access, read data B_DATAIN is returned directly to the second processor.

During the above-described functions and, again, to avoid race conditions, two control signals, namely, a control signal a_wait and a control signal b_wait, act to coordinate memory accesses by the first processor and the second processor, respectively. When asserted (e.g., logic high or "1" level), the control signal a_wait acts to inhibit the first processor from performing memory accesses. Likewise, when asserted (e.g., logic high or "1" level), the control signal b_wait acts to halt the second processor from attempting to access the memory. Both control signals a_wait and b_wait are also generated in the arbitration circuitry 110.

Figure 2:
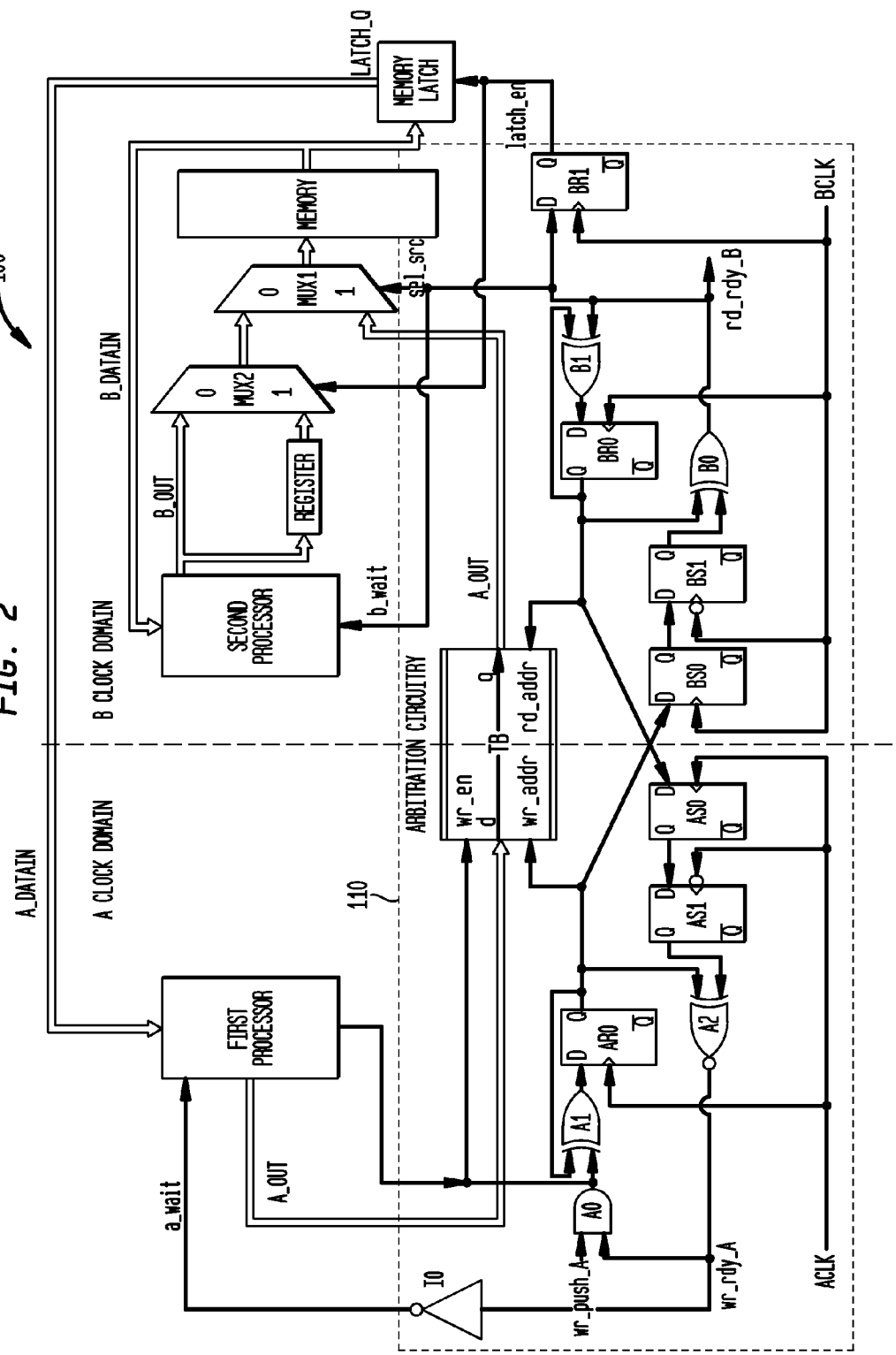
FIG. 2 shows a schematic diagram of at least a portion of the FIG. 1 data processing system, in accordance with an illustrative embodiment of the invention.

With reference now to FIG. 2, a schematic diagram of at least a portion of the data processing system 100 is shown, in accordance with an illustrative embodiment of the invention. In this schematic diagram, at least some elements of the arbitration circuitry 110 are shown in greater detail. Starting at the left of the arbitration circuitry 110 and within the A clock domain, one finds an AND gate A0 with a control signal wr_push_A and a control signal wr_rdy_A serving as inputs. The control signal wr_rdy_A also passes through an inverter I0, which generates the control signal a_wait. The output of the AND gate A0 forms a control signal wr_en, which is passed to a transaction buffer (labeled as "TB" in the figures), and is also supplied to a first input of an exclusive-OR (XOR) gate A1.

The output of the XOR gate A1 is sampled by a flip-flop AR0. The flip-flop AR0 is of a "D-type," also sometimes called a "data" or "delay" flip-flop. A D-type flip-flop stores the state of its data input (D) on each rising or falling edge of a clock signal supplied thereto. The flip-flop's stored state and its digital complement, in turn, are made available at the flip-flop's Q and Q-bar outputs, respectively. In this particular case, the flip-flop AR0 is triggered by each rising edge of a first clock signal, ACLK, for the A clock domain. Clock signal ACLK is supplied externally to the arbitration circuitry 110, as shown. In an alternative embodiment, ACLK may be generated within the arbitration circuitry 110 (e.g., by a clock generator, not explicitly shown). The output (Q) of the flip-flop AR0 generates a control signal wr_addr.

The control signal wr_addr is fed back to a second input of the XOR gate A1 and is also distributed to the transaction buffer, to a first input of an exclusive-NOR (XNOR) gate A2, and to the data input (D) of a D-type flip-flop BS0. In being transmitted to the flip-flop BS0, the control signal wr_addr is passed into (i.e., crosses) the B clock domain. The flip-flop BS0 is operative to sample the control signal wr_addr on each rising edge of a second clock signal, BCLK, for the B clock domain. The clock signal BCLK is supplied externally to the arbitration circuitry 110, as shown. In an alternative embodiment, BCLK may be generated within the arbitration circuitry 110 (e.g., by a clock generator, not explicitly shown). At the same time, another D-type flip-flop, BS1, samples the output of the flip-flop BS0 on each falling edge of the clock signal BCLK. The flip-flops BS0 and BS1 are thereby triggered by inverse transitions in the clock signal BCLK and collectively form a positive-negative edge-triggered two-stage scan synchronizer. Configured in this manner, the flip-flops BS0 and BS1 act to sample an asynchronous control signal (i.e., the control signal wr_addr) and output a version of that control signal that has transitions synchronized to their local domain clock signal (i.e., the clock signal BCLK). The output (Q) of the flip-flop BS1 is supplied to a first input of an XOR gate B0. The output of the XOR gate B0 generates a control signal rd_rdy_B. The control signal rd_rdy_B also propagates as the control signal sel_src that controls the first multiplexer, as well as the control signal b_wait.

The control signal rd_rdy_B is supplied to a first input of an XOR gate B1 as well as to a data input (D) of a D-type flip-flop BR1. The flip-flop BR1 samples the control signal rd_rdy_B on each rising edge of the clock signal BCLK. The output (Q) of the flip-flop BR1 generates the control signal latch_en that acts to enable the memory latch and to control the output of the second multiplexer. The output of the XOR gate B1, in contrast, is presented to another D-type flip-flop BR0. The flip-flop BR0 is triggered on each rising edge of the clock signal BCLK. The output (Q) of the flip-flop BR0 forms a control signal rd_addr, which is fed back to a second input of the XOR gate B1, and is also supplied to a second input of the XOR gate B0. The control signal rd_addr is also supplied to the transaction buffer and to the data input (D) of a D-type flip-flop AS0 in the A clock domain.

The flip-flop AS0 samples the control signal rd_addr on each rising edge of the clock signal ACLK. Another D-type flip-flop AS1, in turn, samples the output (Q) of the flip-flop AS0 on each falling edge of the clock signal ACLK. The flip-flops AS0 and AS1 are therefore triggered by inverse clock transitions and collectively act to synchronize transitions of the control signal rd_addr to the clock signal ACLK, thereby effectively forming a positive-negative edge-triggered two-stage scan synchronizer. The output (Q) of the flip-flop AS1 is fed to a second input of the XNOR gate A2, which acts to generate the control signal wr_rdy_A.

In the particular non-limiting illustrative embodiment shown in FIG. 2, the transaction buffer is operative as a storage device with two addressable locations, a first addressable location and a second addressable location. The transaction buffer may comprise, for example, a first-in-first-out (FIFO) register. Each of the addressable locations within the transaction buffer has a width sufficient to store the memory access data A_OUT. Writing to the transaction buffer via an input (d) is enabled by assertion of the control signal wr_en (e.g., high logic level). When the control signal wr_en is low (i.e., de-asserted), data stored in the transaction buffer is made available at its output (q). The addressable location to which data is written within the transaction buffer is selected by the control signal wr_addr, which may be a write address. The addressable location from which data is made available is determined by the control signal rd_addr, which may be a read address. The control signals wr_addr and rd_addr thereby act as address pointers for writing to and reading from, respectively, the transaction buffer. Because there are only two addressable locations within the transaction buffer in this embodiment, the control signals wr_addr and rd_addr each need only consist of a single respective bit of data. For the selection of more than two addressable locations in the transaction buffer, the control signals wr_addr and rd_addr would comprise a plurality of bits.

The memory latch in the present illustrative embodiment is a latch of sufficient width to allow read data A_DATAIN to be stored when the memory latch is enabled. Here, the memory latch is enabled when the control signal latch_en is asserted high (i.e., the latch is a "+VE" latch). With the memory latch enabled, the memory latch becomes largely transparent to the first processor because the memory latch's output (LATCH_Q) matches its input. Accordingly, with the memory latch enabled, the first processor is operative to read the read data A_DATAIN from the memory.

Figure 3:
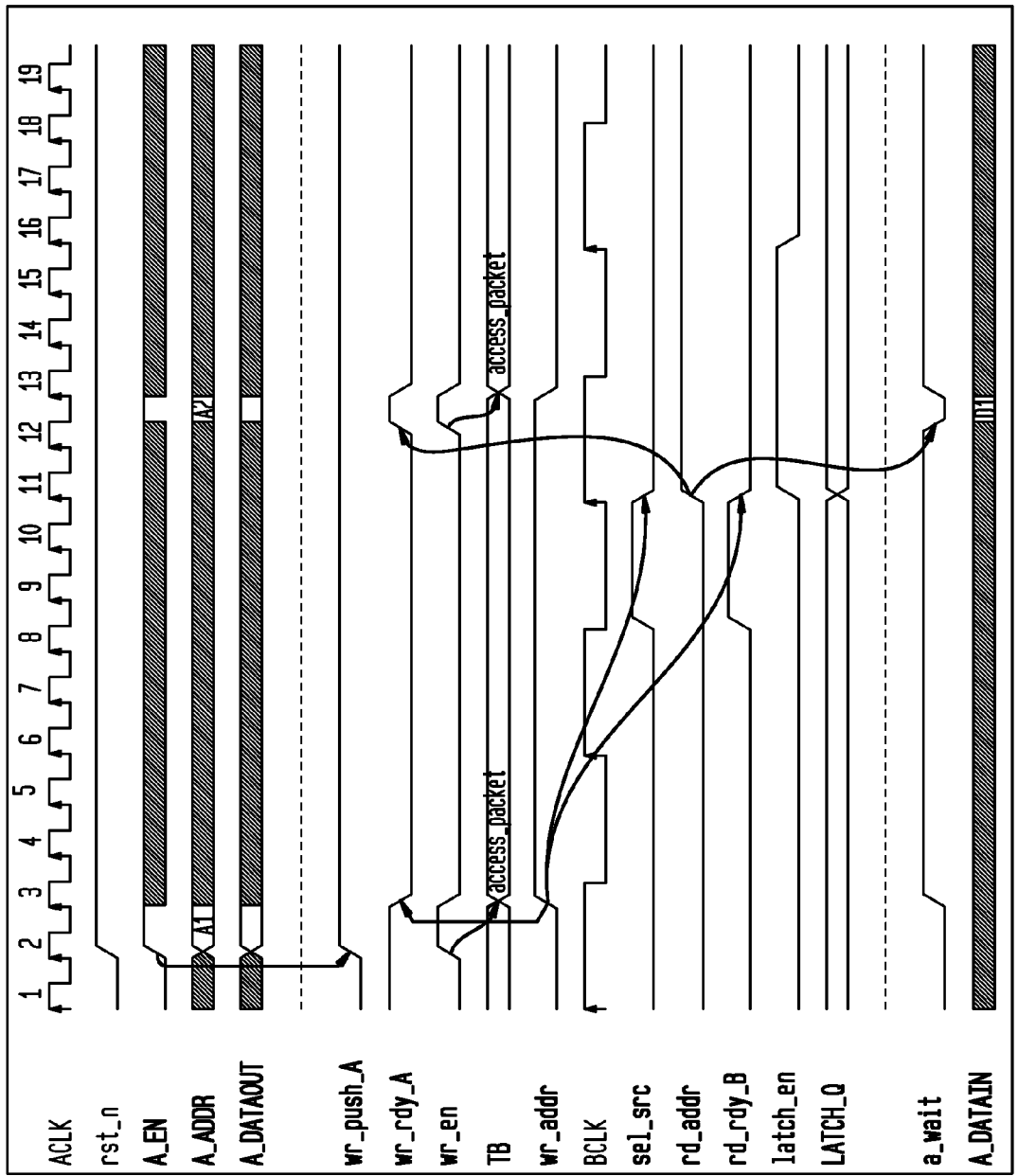
FIG. 3 shows a timing diagram for read accesses within the FIG. 1 data processing system, in accordance with an illustrative embodiment of the invention.

Once so configured, the data processing system 100 allows the first processor and the second processor to access the memory with minimal access latency even if the A clock domain and the B clock domain are operated at highly varied frequencies that are asynchronous with respect to one another. By way of example only and without loss of generality, FIG. 3 shows a timing diagram for read accesses by the first processor, in accordance with an illustrative embodiment of the invention. In this particular non-limiting embodiment, the clock signal ACLK operates at a higher frequency than the clock signal BCLK. Initially, at clock cycle CY1 (where, for this description, "CYx" corresponds to a cycle number, x, of the clock signal ACLK, where x is an integer), the control signal wr_rdy_A is high to accept a new transaction from the first processor, and the remainder of the control signals are low. In clock cycle CY2, a read access is initiated by the first processor. The first processor generates the appropriate memory access data A_OUT, and the control signal wr_push_A is asserted high to indicate a transaction is available from the first processor.

The combination of the control signal wr_push_A and the control signal wr_rdy_A both being high causes the control signal wr_en to also transition high. The assertion of the control signal wr_en causes the memory access data A_OUT to be transferred (i.e., pushed) into the transaction buffer. Because the control signal wr_addr is low when the push occurs, the memory access data A_OUT is written into the first addressable location in the transaction buffer. At the beginning of the next clock cycle CY3, the control signals wr_push_A, wr_rdy_A, and wr_en transition low, and the control signal wr_addr and a_wait transition high to indicate a transaction from the first processor is being processed. With the control signal wr_en low and the control signal rd_addr low (pointing to the first addressable location in the transaction buffer), the access data A_OUT is made available at the transaction buffer's output (q). This output (q) does not cause any metastability issues in the B clock domain because the control signal sel_src defaults to having the first multiplexer output the access data B_OUT (i.e., the control signal sel_src is low at this stage in the process). As a result, the memory does not see the output (q) from the transaction buffer until a later time.

The transition in the control signal wr_addr is passed to the B clock domain through the flip-flops BS0 and BS1, which act to synchronize it to the clock signal BCLK. On the next rising edge in the clock signal BCLK, which occurs near clock cycle CY6, the change in the control signal wr_addr is sampled by the flip-flop BS0. On the next falling edge of the clock signal BCLK, which occurs about half way through clock cycle CY8, the change in the control signal wr_addr is sampled by the flip-flop BS1. In response, the control signals sel_src and rd_rdy_B transition high. The control signals sel_src and rd_rdy_B are thereby generated at least in part in response to the control signal wr_addr, but are synchronized to the clock signal BCLK. The rise in the control signal sel_src configures the first multiplexer to output the data available from the transaction buffer. In this manner, the memory access data A_OUT is transferred into the memory in clock cycles CY8-CY10.

The control signals sel_src and rd_rdy_B remain high until the next rising edge in the clock signal BCLK near clock cycle CY11, at which point they transition low and the control signals latch_en and rd_addr transition high. The high control signal latch_en causes the memory latch to become enabled and this condition is maintained for one full cycle of the clock signal BCLK to allow the memory latch to capture the output of the memory. The memory latch thereby becomes transparent to the first processor. Concurrently, the transition in the control signal rd_addr is passed to the A clock domain in a manner similar to the way the transition in the control signal wr_addr was passed to the B clock domain. More particularly, the transition in the control signal rd_addr is sampled by the flip-flop AS0 on the next rising edge of the clock signal ACLK at the beginning of clock cycle CY12. On the next falling edge of the clock signal ACLK, half way through the clock cycle CY12, the change in rd_addr is sampled by the flip-flop AS1. The transition in the output of the flip-flop AS1 causes the control signals wr_rdy_A to transition high and signal a_wait to transition low for half of a cycle of the clock signal ACLK. Accordingly, the control signals wr_rdy_A and a_wait are generated in response to the control signal rd_addr, but are synchronized to the clock signal ACLK. The first processor is thereby signaled to read the read data A_DATAOUT from the memory through the memory latch. Moreover, if wr_push_A remains asserted high when the control signal wr_rdy_A transitions high (as is the case in FIG. 3), the control signal wr_en also transitions high in the second half of the clock cycle CY12, allowing the first processor to initiate another memory access and the access sequence to repeat. However, in the next access sequence, the memory access data is stored in and read from the second addressable location in the transaction buffer rather than from the first addressable location, causing subsequent transactions to be stored in an alternating fashion between the first and second addressable locations.

In this manner, the first processor is operative to perform a read access in about one cycle of the clock signal ACLK and about two cycles of the clock signal BCLK. Such memory access times are very short when compared to other known designs that include a processor in one clock domain accessing a memory in a different clock domain. For comparison, other designs may require two cycles of the clock signal ACLK and four cycles of the clock signal BCLK to perform a read access. Moreover, memory accesses by the second processor in the present embodiment may be completed in only one cycle of the clock signal BCLK while the control signal b_wait is low. Accordingly, embodiments in accordance with aspects of the present invention are capable of providing higher processor bandwidth.

While read memory accesses by the first processor were described above with reference to FIG. 3, write memory accesses are performed in a similar manner. In the case of a write memory access, of course, no stored data in the memory is transmitted back to the first processor.

As discussed above, embodiments of the invention may be implemented in an integrated circuit. Once understood from the teachings herein, many, if not all, of the digital elements described in FIGS. 1 and 2 may, for example, be implemented utilizing elements from standard cell libraries. In forming integrated circuits, identical die are typically fabricated in a repeated pattern on a surface of a semiconductor wafer. Each die includes a device described herein, and may include other structures and/or circuits. The individual die are cut or diced from the wafer, then packaged as an integrated circuit. One skilled in the art would know how to dice wafers and package die to produce integrated circuits.

An integrated circuit in accordance with embodiments of the invention can be employed in essentially any application and/or electronic system in which a memory device (e.g., standalone or embedded) is accessed by respective processors residing in different clock domains. Suitable systems for implementing techniques of the invention may include, but are not limited to, clock distribution and recovery systems, personal computers, communication systems, electronic instruments (e.g., automated test equipment (ATE)), interface networks, high-speed memory interfaces (e.g., DDR3, DDR4), etc. Systems incorporating such integrated circuits are also considered part of the claimed invention.

It should again be emphasized that the above-described embodiments of the invention are intended to be illustrative only. Other embodiments may use different types and arrangements of elements for implementing the described functionality. In another embodiment, a skilled artisan will recognize that many of the logic gates described with reference to FIGS. 1 and 2 may be replaced by one or more different respective logic gates without affecting the overall functionality of the data processing system. More specifically, a skilled artisan will recognize that an AND functionality may be implemented by one or more NAND gates, NOR gates, and/or XOR gates, or any suitable combination thereof. In yet another embodiment, a person of ordinary skill in the electronic arts will recognize that, where a particular element in the above-described embodiments is triggered by a rising edge of a clock signal or enabled by a high-level control signal, an equally suitable alternative embodiment might have the same element triggered by a falling edge of the clock signal or enabled by a low-level control signal with only minor design changes thereto (e.g., by adding an inversion in a given signal path). In even another embodiment, one skilled in the art will recognize that embodiments of the invention may be implemented with a transaction buffer comprising only a single storage location (instead of two addressable locations as described above). In yet another example, an application having more than two clock domains might have a processor operating in one of the clock domains that is operative to access memories in more than one of the other clock domains. More generally, in the application having more than two clock domains, a processor operating in any one of the clock domains can be operative to access a memory in any of the other clock domains. These numerous alternative embodiments within the scope of the appended claims will be apparent to one skilled in the art given the teachings herein.

Moreover, the features disclosed herein may be replaced by alternative features serving the same, equivalent, or similar purposes, unless expressly stated otherwise. Thus, unless expressly stated otherwise, each feature disclosed is one example only of a generic series of equivalent or similar features.

What is claimed is:
1. A data processing system comprising:
a first processor, the first processor operating in a first clock domain with a first clock signal;
a memory, the memory operating in a second clock domain with a second clock signal;
a storage device;
first synchronization circuitry comprising a first storage element and a second storage element, the first storage element sampling a signal emanating from the second clock domain, and the second storage element sampling an output of the first storage element, the first storage element and the second storage element being triggered by inverse transitions in the first clock signal; and
second synchronization circuitry comprising a third storage element and a fourth storage element, the third storage element sampling a signal emanating from the first clock domain, and the fourth storage element sampling an output of the third storage element, the third storage element and the fourth storage element being triggered by inverse transitions in the second clock signal;

wherein the data processing system is operative to cause the first processor to transfer a memory address to the storage device, to cause the memory address to be transferred from the storage device to the memory at least in part in response to a signal from the second synchronization circuitry, and to cause data associated with the memory address in the memory to be transferred to the first processor at least in part in response to a signal from the first synchronization circuitry.

2. The data processing system of claim 1, wherein the memory is of a static type.

3. The data processing system of claim 1, wherein the memory comprises a single-ported memory.

4. The data processing system of claim 1, wherein the memory comprises a shared peripheral.

5. The data processing system of claim 1, wherein the storage device comprises a register.

6. The data processing system of claim 5, wherein the register comprises a first-in-first-out register.

7. The data processing system of claim 1, wherein the storage device comprises two addressable storage locations.

8. The data processing system of claim 1, wherein the first clock signal and the second clock signal operate at substantially different frequencies.

9. The data processing system of claim 1, wherein the first clock signal and the second clock signal are substantially asynchronous.

10. The data processing system of claim 1, wherein at least one of the first storage element, the second storage element, the third storage element, and the fourth storage element comprises a flip-flop.

11. The data processing system of claim 1, wherein the data processing system is operative to cause the first processor to write the memory address to the storage device at least in part in response to the signal from the first synchronization circuitry.

12. The data processing system of claim 1, further comprising a latch interposed between the memory and the first processor.

13. The data processing system of claim 12, wherein the data processing system is operative to cause data associated with the memory address in the memory to be transferred to the first processor at least in part by enabling the latch.

14. The data processing system of claim 12, wherein the latch is enabled at least in part in response to the signal from the second synchronization circuitry.

15. The data processing system of claim 1, further comprising a second processor, the second processor operating in the second clock domain and operative to access the memory.

16. The data processing system of claim 1, further comprising a multiplexer, the multiplexer comprising a first input for receiving a signal from the storage device, a second input for receiving a signal from the second processor, and an output for providing a signal to the memory.

17. The data processing system of claim 16, wherein the output of the multiplexer is selected at least in part in response to the signal from the second synchronization circuitry.

18. The data processing system of claim 1, wherein the data processing system is operative to have the first processor read data from the memory in about one cycle of the first clock signal plus about two cycles of the second clock signal.

19. Arbitration circuitry adapted for use with a data processing system including a processor operating in a first clock domain with a first clock signal and a memory operating in a second clock domain with a second clock signal, the arbitration circuitry comprising:
  a storage device;
  first synchronization circuitry comprising a first storage element and a second storage element, the first storage element sampling a signal emanating from the second clock domain, and the second storage element sampling an output of the first storage element, the first storage element and the second storage element being triggered by inverse transitions in the first clock signal; and
  second synchronization circuitry comprising a third storage element and a fourth storage element, the third storage element sampling a signal emanating from the first clock domain, and the fourth storage element sampling an output of the third storage element, the third storage element and the fourth storage element being triggered by inverse transitions in the second clock signal;
  wherein the data processing system is operative to cause the processor to transfer a memory address to the storage device, to cause the memory address to be transferred from the storage device to the memory at least in part in response to a signal from the second synchronization circuitry, and to cause data associated with the memory address in the memory to be transferred to the processor at least in part in response to a signal from the first synchronization circuitry.

20. A method for allowing a processor operating in a first clock domain with a first clock signal to read data stored in a memory operating in a second clock domain with a second clock signal, the method comprising the steps of:
  causing the processor to transfer a memory address to a storage device;
  causing the memory address to be transferred from the storage device to the memory at least in part in response to a signal from second synchronization circuitry; and
  causing data associated with the memory address in the memory to be transferred to the processor at least in part in response to a signal from first synchronization circuitry;
  wherein the first synchronization circuitry comprises a first storage element and a second storage element, the first storage element sampling a signal emanating from the second clock domain, and the second storage element sampling an output of the first storage element, the first storage element and the second storage element being triggered by inverse transitions in the first clock signal; and
  wherein the second synchronization circuitry comprises a third storage element and a fourth storage element, the third storage element sampling a signal emanating from the first clock domain, and the fourth storage element sampling an output of the third storage element, the third storage element and the fourth storage element being triggered by inverse transitions in the second clock signal.

* * * * *